Aug. 4, 1931.                C. L. EKSERGIAN ET AL                1,817,070
                                BAR CUTTING MECHANISM
                                Filed Oct. 18, 1929
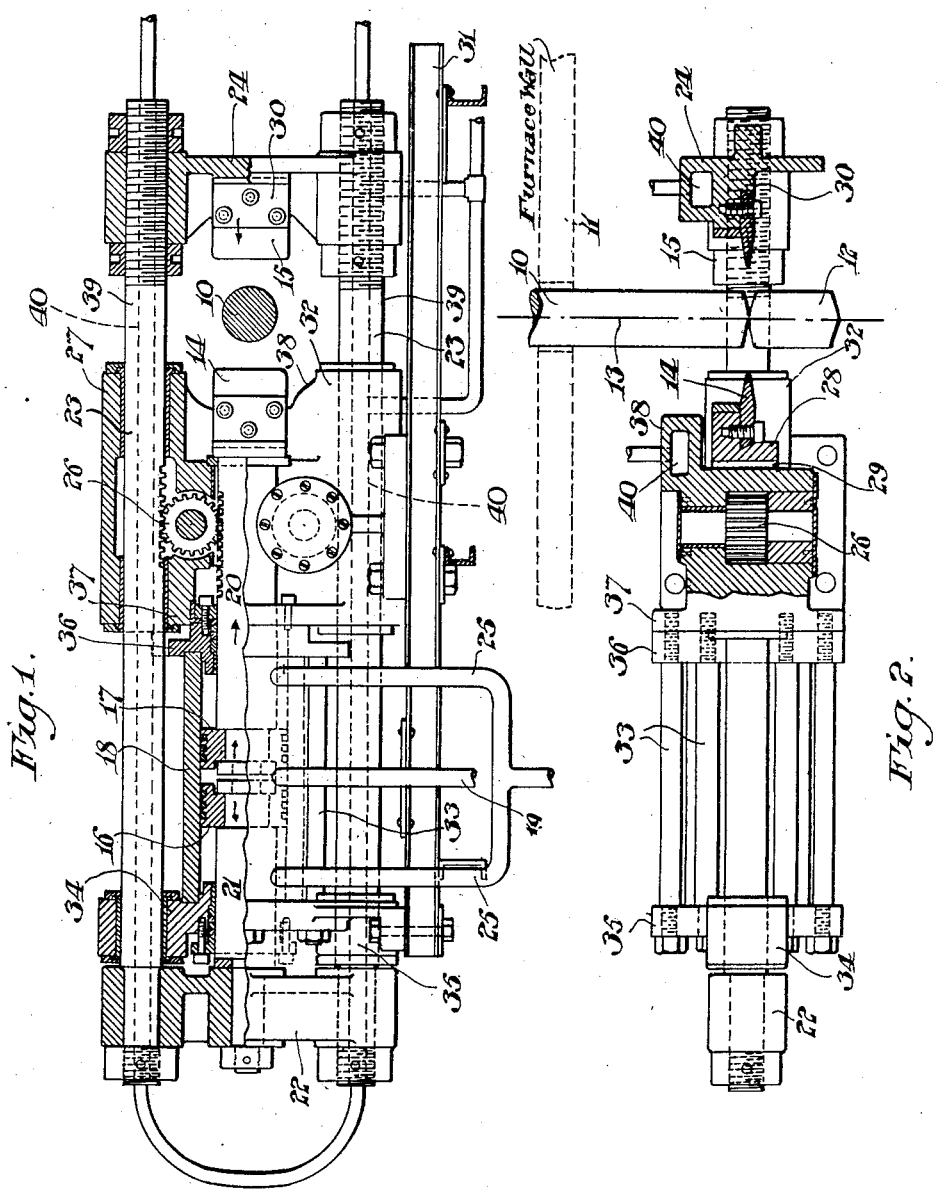
INVENTORS:
*Carolus L. Eksergian
and William A. Weightman,*
BY
                                                ATTORNEY.

Patented Aug. 4, 1931

1,817,070

UNITED STATES PATENT OFFICE

CAROLUS L. EKSERGIAN, OF DETROIT, MICHIGAN, AND WILLIAM A. WEIGHTMAN, OF PHILADELPHIA, PENNSYLVANIA, ASSIGNORS TO BUDD WHEEL COMPANY, OF PHILADELPHIA, PENNSYLVANIA, A CORPORATION OF PENNSYLVANIA

BAR CUTTING MECHANISM

Application filed October 18, 1929. Serial No. 400,480.

The hot bar cut-off machine of our invention finds its greatest utility in the cutting of the massive hot bar stock several inches in diameter commonly used in the forging of wheel hubs and such articles. Its practicalness and simplicity are such as in all probability to give it adaptation to other kinds of work, hot or cold, and to different grades of work, particularly hot work irrespective of the diameter of the bar.

With particular reference to the heavy work in which our invention finds its greater utility, we have aimed to produce a knife operating means of great power, yet perfect process and symmetry of operation; to arrange the operating mechanism so far as possible outside of the flame zone and perhaps also of the extremely heated zone of the work itself; to provide for adequate interior fluid cooling of the knives, their mountings and their intermediate operating members, in short, everything which of necessity must lie in or close to the flame zone; to simplify and compact the entire mechanism; to adequately provide for accessibility for renewals and repairs of parts and to give every access for all cooling, power and operating and control connections; to provide an arrangement of parts affording extreme accessibility and ease of knife mounting to facilitate renewal and re-fitting of knives, yet retain every necessary sturdiness of knife mounting; and with the foregoing to attain that ruggedness of construction throughout necessary for reliability in heavy duty work.

We secure these objects by using opposed cut-off knives on opposite sides of the bar axis, individual motor means connected respectively to operate the knives but located both on the same side of said bar axis and in the same plane as the knives, together with motion synchronizing means between the motor means, and a fluid cooling system which courses through all parts of the mechanism exposed to the extreme heat of the flame area about the stock to be cut. More specifically, the individual motor means are oppositely acting, comprising an hydraulic cylinder having opposed motor pistons. The operating connections comprise the rod between the one piston and the adjacent knife, and symmetrically disposed connecting rods between the remote piston and knife. Thus between the adjacent piston and knife the piston rod constitutes a push cutting stroke connection, and between the other knife and piston the connecting rods constitute pull cutting stroke connections. The water cooling system extends through channels in the rods and their mountings. The arrangement is such that only the mountings, the rods and the knives which they together mount and operate, lie immediately in the flame zone of the bar stock. The synchronizing and motor means lie without that zone in regions where they are relatively unaffected by the high heat and can be lubricated and operated with certainty and precision.

The accompanying drawings show the best form of our invention now known to us. Of them, Figure 1 is the longitudinal side elevation transverse to the axis of the bar with parts broken away in the transverse plane.

Figure 2 is a plan view of this mechanism showing the parts broken away in the plane parallel to the axis of the bar.

The hot bar stock 10 is fed to the cut-off mechanism from the furnace 11, the face of which is shown in dotted lines. This stock 10 is cut by the mechanism of our method into slugs or billets 12 of a size suitable for fabricating wheel hubs, wheel discs or the like. Ordinarily this stock is from four to eight inches in diameter and at a temperature of about 2000° F.

The opposed cut-off knives on opposite sides of the bar axis 13 are designated respectively 14 and 15. The individual motor means connected to operate said knives respectively are pistons 16 and 17 of the hydraulic operating cylinder 18 all located on one side, in this case the left side, of the axis 13 of the bar stock to be cut and in the same transverse plane as the knives themselves. Fluid for the cutting stroke is admitted to cylinder 18 intermediate the pistons 16 and 17 by means of conduit 19 and operates them oppositely to force the knives toward each other. The knife 14 to which the piston 17 is adjacent is directly connected with it by a piston rod 20. The knife 15 and the piston 16 remote from each other are indirectly connected together through piston rod 21 directly connected with the piston 16, cross head 22 carried on the outer end of the piston rod 21, parallel connecting rods 23 symmetrically arranged with respect to the axis of the piston rod 20 and a second cross head 24 which carries knife 15. The retracting stroke of the motors is by means of operating fluid admitted to opposite ends of cylinder 18 through a conduit 25 communicating with the opposite ends. The motion of the knives is synchronized through pinions 26 carried in the main frame 27 of the mechanism in the space between piston rod 20 and connecting rods 23 and having a geared connection with them. All of the foregoing parts are arranged in the common plane of the knives 14 and 15 and transverse to the axis 13 of the bar stock to be cut.

In detail, knife 14 is bolted to an offset 28 in the end 29 of piston rod 20, which offset presents forwardly from the furnace line so that the knives may be freely removed and replaced by operations conducted in general parallel to the axis of the bar stock. Similar offset 30 provides mounting for the knife 15 in the cross head 24.

The main frame 27 is bolted upon the structural steel base 31. It provides not only bearings for the pinions 26 but also upper and lower extended bearings 32 for the connecting rods 23. This frame 27 is located entirely on one side of the axis 13 of the bar stock, the same side as the knife 14 operated by the adjacent pistons 17, and the connecting rods 13 project past the bar and to the opposite side thereof where they are adjustably connected with the cross head 24 which mounts the opposite knife 15.

Hydraulic cylinder 18 is clamped ruggedly to the massive frame member 27 by means of an annular series of bolts 33. The outboard head 34 of the cylinder is constituted by a second frame member 35 also bolted down to the structural steel base frame 31. The inboard head 36 is constituted by a separate member, not itself a frame member, but clamped up by bolts 33 intermediate the end of cylinder 18 and the adjoining head 37 of the base member 27. Thereby upon the loosening of the clamping bolts 33, cylinder head 36 may be separated from the frame 27 and access may be had to the inboard piston packing which can be discerned in the section of Fig. 1. The outboard piston packing is, of course, readily accessible between cross head 22 and the cylinder head 36, but the inboard packing, on account of the necessary massiveness of frame member 27 and its mounting of the motion synchronizing pinion mechanism 26 on opposite flanks of the piston 20, does not admit of free access.

Thus, all of the mechanisms, with the exception of the knives themselves, the inboard end of piston rod 20, the inboard ends 38 of the frame 27, the overlying portions 39 of the connecting rods 33, and the mounting 24, lie entirely without the extremely hot zone immediately surrounding the bar 10 and its exit from the furnace 11. These latter parts, however, are provided interiorly with inter-communicating ducts 40 through which water or other fluid cooling means is circulated in series or otherwise as may be desired. Particularly are such ducts provided in those portions of members 27 and 24 flanking the furnace and the exit of the bar 10 therefrom.

In operation, the bar is advanced from the furnace and the position by its projected end so as to insure intersection by the knife at a point to provide a billet 12 of exactly the proper length. Connections 25 are connected with relatively low pressure or exhaust fluid. High pressure operating fluid is admitted by conduit 19 and drives the pistons 15 and 17 simultaneously oppositely under the high force derived through their adjacent ends of relatively large area. The knives approach each other, enter the work and cut all the way to the axis 13. The while, irrespective of difficulties in resistance encountered, the cut-off motion of the respective knives is synchronized through the inter-connecting means 26. The cutting stroke involves a push on the part of the piston means 17 through the direct connecting piston rod 20 to knife 14 and the pull on the part of connecting rods 23 indirectly connected to knife 15 through the oppositely acting piston rod 21, cross head 22 and cross head 24.

The cutting stroke complete conduit 19 is relieved of pressure and fluid pressure applied to conduits 25 and the low pressure side of pistons 16 and 17, that is to say, the side of lesser area incident to the direct piston connection thereto. Under the lesser force so derived, the knives are synchronously retracted.

The simplicity and practicalness of our mechanism and the arrangement of its parts as described attain for us each and every one of the objects we have set forth.

All modifications and improvements falling within the generic spirit of our invention should be protected to us so far as the prior art does not require restriction to the precise terminology employed in seeking to claim it.

What we claim as new and useful and desire to protect by Letters Patent is:—

1. A hot bar cut-off machine comprising cut-off knives disposed on opposite sides of the bar axis and a hydraulic cylinder on one side of said axis, opposed pistons in said cylinder, a piston rod connecting that knife and piston adjacent to each other, and a pair of connecting rods disposed symmetrically of the piston rod and connecting the piston and knife remote from each other.

2. A hot bar cut-off machine comprising cut-off knives disposed on opposite sides of the bar axis and a hydraulic cylinder on one side of said axis, opposed pistons in said cylinder, a piston rod connecting that knife and piston adjacent to each other, and a pair of connecting rods disposed symmetrically of the piston rod and connecting the piston and knife remote from each other, together with motion synchronizing pinions gearing together the piston and connecting rods in the spaces between them.

In testimony whereof we hereunto affix our signatures.

CAROLUS L. EKSERGIAN.
WILLIAM A. WEIGHTMAN.